United States Patent
Mueller et al.

(10) Patent No.: US 8,893,386 B2
(45) Date of Patent: Nov. 25, 2014

(54) METHOD AND APPARATUS FOR BACKING THE INSIDE TEETH OF A SLIDING SLEEVE PRODUCED BY WAY OF POWDER METALLURGY FOR A MANUAL TRANSMISSION

(75) Inventors: Alexander Mueller, Altmuenster (AT); Helmut Pamminger, Voecklabruck (AT)

(73) Assignee: Miba Sinter Austria GmbH, Laakirchen (AT)

( * ) Notice: Subject to any disclaimer, the term of this patent is extended or adjusted under 35 U.S.C. 154(b) by 601 days.

(21) Appl. No.: 12/998,774

(22) PCT Filed: Dec. 14, 2009

(86) PCT No.: PCT/AT2009/000484
§ 371 (c)(1),
(2), (4) Date: May 31, 2011

(87) PCT Pub. No.: WO2010/075600
PCT Pub. Date: Jul. 8, 2010

(65) Prior Publication Data
US 2011/0232092 A1    Sep. 29, 2011

(30) Foreign Application Priority Data
Dec. 16, 2008    (AT) .............................. A 1962/2008

(51) Int. Cl.
*B21K 1/30*    (2006.01)
*B21H 5/02*    (2006.01)

(52) U.S. Cl.
CPC ... *B21H 5/022* (2013.01); *B21K 1/30* (2013.01
USPC ........................................ 29/893.32; 72/85 )

(58) Field of Classification Search
USPC .................. 29/893.32, 893.3, 893; 72/67–123
See application file for complete search history.

(56) References Cited

U.S. PATENT DOCUMENTS

| | | | | |
|---|---|---|---|---|
| 1,510,889 | A * | 10/1924 | Hooker | 72/85 |
| 1,712,095 | A * | 5/1929 | Schurr | 72/102 |
| 1,935,965 | A * | 11/1933 | Wahlberg | 192/69.9 |
| 3,735,618 | A * | 5/1973 | Zook | 72/91 |

(Continued)

FOREIGN PATENT DOCUMENTS

| | | |
|---|---|---|
| DE | 4117365 C1 * | 5/1992 |
| DE | 4200418 C1 * | 12/1992 |

(Continued)

OTHER PUBLICATIONS

English Machine Translation of De4200418C1 from espacenet.com.*
International Search Report of PCT/AT2009/000484, Apr. 26, 2010.

*Primary Examiner* — Jacob Cigna
(74) *Attorney, Agent, or Firm* — Collard & Roe, P.C.

(57) ABSTRACT

A method for backing the inside teeth (2) of a sliding sleeve (3) produced by way of powder metallurgy for a manual transmission is described where the backings (1) of the teeth (4) forming the front-side pitches (9) are formed with the aid of a rolling tool (5) by back rolling accompanied by plastic deformation of material from the backing region. In order to prevent burr formation, it is proposed that the front-side tooth sections (8) delimited by the backings (1) are simultaneously calibrated whilst forming and/or calibrating the relevant pitches (9) with the aid of the rolling tool (5) for forming the backings (1).

2 Claims, 4 Drawing Sheets

(56) References Cited

U.S. PATENT DOCUMENTS

| | | | |
|---|---|---|---|
| 3,765,202 A * | 10/1973 | Bauknecht et al. | 72/94 |
| 3,777,345 A * | 12/1973 | Brown | 72/102 |
| 5,096,037 A * | 3/1992 | Knoess et al. | 192/108 |
| 5,701,574 A | 12/1997 | Derflinger et al. | |
| 6,216,550 B1 * | 4/2001 | Schwuger et al. | 74/339 |
| 6,730,263 B2 | 5/2004 | Ernst et al. | |
| 6,883,358 B2 * | 4/2005 | Hauf | 72/85 |
| 7,246,439 B2 | 7/2007 | Rau et al. | |
| 2001/0025520 A1 * | 10/2001 | Tittmann | 72/102 |
| 2009/0142153 A1 * | 6/2009 | Prock et al. | 409/12 |

FOREIGN PATENT DOCUMENTS

| | | |
|---|---|---|
| DE | 44 18 632 | 12/1994 |
| DE | 196 04 386 | 8/1996 |
| DE | 197 44 639 | 2/1999 |
| DE | 198 09 039 | 9/1999 |
| DE | 198 50 326 | 5/2000 |
| DE | 199 33 468 | 1/2001 |
| DE | 101 22 184 | 11/2002 |
| DE | 102 50 432 | 5/2004 |

* cited by examiner

METHOD AND APPARATUS FOR BACKING THE INSIDE TEETH OF A SLIDING SLEEVE PRODUCED BY WAY OF POWDER METALLURGY FOR A MANUAL TRANSMISSION

CROSS REFERENCE TO RELATED APPLICATIONS

This application is the National Stage of PCT/AT2009/000484 filed on Dec. 14, 2009, which claims priority under 35 U.S.C. §119 of Austrian Application No. A 1962/2008 filed on Dec. 16, 2008, the disclosure of which is incorporated by reference. The international application under PCT article 21(2) was not published in English.

FIELD OF THE INVENTION

The invention relates to a method for backing the inside teeth of a sliding sleeve produced by way of powder metallurgy for a manual transmission, where the backings of the teeth forming the front-side pitches are formed with the aid of a rolling tool by back-rolling accompanied by plastic displacement of material from the backing region.

DESCRIPTION OF THE PRIOR ART

Recesses in the region of the tooth flanks of the inner teeth of annular components are designated as backing if they cannot be produced with tool delivery axially parallel to the ring axis but require setting of the tool onto the workpiece radially outwards. For reasons of cost such backings of the inner teeth of sliding sleeves for manual transmissions are frequently fabricated by back rolling accompanied by a plastic displacement of material from the backing region, in which case undesired geometrical deformations and burr formations in the tooth region cannot be avoided so that an expensive finishing treatment is required. In order to avoid these disadvantages, it has already been proposed (DE 198 09 039 A1, DE 101 22 184 A1) to create free spaces in the region of the tooth head into which the plasticised material can be displaced in order to avoid accumulations of material in the region of functional surfaces of the sliding sleeve. Despite this measure, it has not however been possible to fabricate backings meeting higher requirements by means of rolling tools so that in such cases milling of the backings is avoided (DE 102 50 432 A1).

SUMMARY OF THE INVENTION

It is therefore the object of the invention to configure a method of the type described initially for backing the inside teeth of a sliding sleeve produced by way of powder metallurgy for manual transmissions such that after back rolling the backings, a dimensionally stable, largely burr-free workpiece is obtained without expensive finishing treatment.

The invention solves the formulated object by calibrating the front-side tooth sections delimited by the backings whilst shaping and/or calibrating the relevant pitches with the aid of the rolling tool for forming the backings.

Since as a result of these measures, not only the backing region is back rolled but the front-side tooth sections delimited by the backings are also subjected to plastic deformation, which effects at least a calibrating of these tooth sections provided with front-side pitches if the pitches are not first formed with the rolling tool, the plastic displacement of material over the entire front-side tooth section can be better controlled with the effect that the material accumulations which restrict the dimensional accuracy and functional efficiency and therefore burr formations can be avoided. It is therefore possible to produce backings of the inside teeth of sliding sleeves without milling treatment with the aid of a rolling tool under series production conditions with sufficient dimensional accuracy in order to satisfy even higher requirements on the precision.

In order to assist the flow of plasticised material in a desired form, the rolling tool can be pressed in an oscillating manner onto the inside teeth of the sliding sleeve, where the amplitude and direction of the oscillations or pulses should be selected depending on the tool and the shape to be produced. Such oscillation of the rolling tool can be achieved by a corresponding tumbling of the rolling tool.

For carrying out such a method, a usual apparatus for backing the inside teeth of a sliding sleeve produced by way of powder metallurgy for a manual transmission having a rolling tool profiled according to the backing can be taken as the starting point if the rolling tool has a profile section adjoining the profile shape for the backing, which corresponds to the final form of the front-side tooth sections of the inside teeth delimited by the backings. In this case, not only the backing is rolled into the tooth head but at the same time, the front-side tooth section separated from the remaining tooth by the backing is treated so that no accumulations of material caused by a local delimitation of the rolling tool can be obtained along this tooth section. In addition, the profile shape of the rolling tool extending over the entire front-side tooth section including the backing brings about a calibrating of these tooth regions which ensures the required dimensional stability.

The rolling tool can be arranged in a conventional manner with an axis of rotation parallel to the axis of the sliding sleeve which, however brings with it the disadvantage that the impact forces due to the rolling tool are directed radially outwards. In order that deformation forces having a more strongly defined component in the axial direction can be used for the deformation process, the axes of rotation of the rolling tool and the sliding sleeve can together include an acute angle so that the radial impact of the rolling tool in relation to the sliding sleeve to be treated brings with it force components in the radial and axial direction. The inclined arrangement of the rolling tool in relation to the sliding sleeve furthermore constitutes advantageous conditions for the simultaneous use of two rolling tools, with the result that the treatment process can be accelerated accordingly.

BRIEF DESCRIPTION OF THE DRAWING

The method according to the invention will be explained in detail with reference to the drawings. In the figures.

DESCRIPTION OF THE PREFERRED EMBODIMENT

Figure 1:
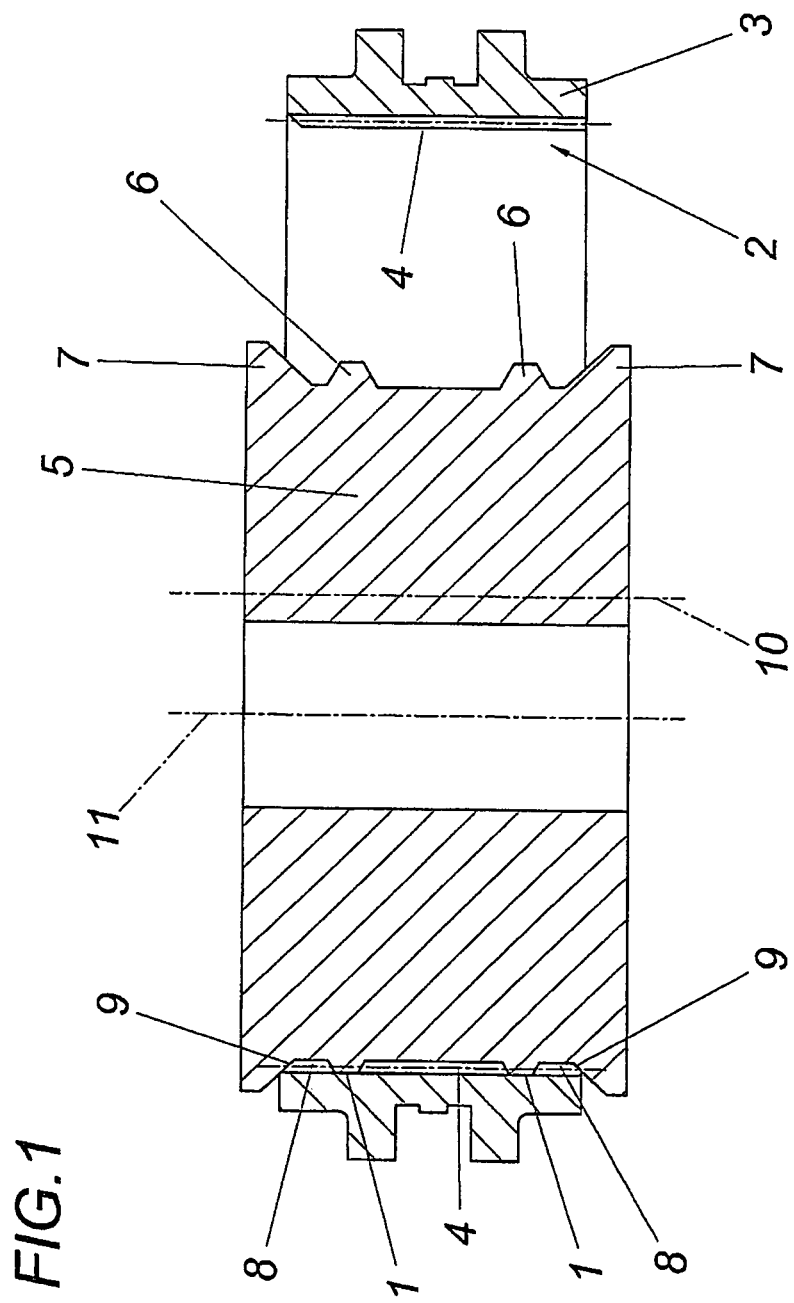
FIG. 1 shows an apparatus according to the invention for the backing of the inside teeth of a sliding sleeve produced by way of powder metallurgy for a manual transmission in a schematic axial section through the sliding sleeve with a rolling tool parallel to the sliding sleeve and FIGS. 2 to 4 show diagrams corresponding to FIG. 1 of the possible arrangement of rolling tools with axis of rotation inclined with respect to the axis of the sliding sleeve.

The inside teeth 2 of a sliding sleeve 3 to be produced with backings 1 for a conventional manual transmission, for example, of a motor vehicle, are formed in the sliding sleeve 3, which is produced by a corresponding sintering of a compression-moulded iron material by way of powder metallurgy, by axially continuous teeth 4 over the sleeve width, which according to the exemplary embodiment shown have a preform for a subsequent pitch on a front side, but otherwise have axially parallel flanks and an axially parallel head. In order to be able to back roll the backings 1 by means of a rolling tool 5 through a plastic displacement of material, the profile tool has a profile shape adapted to the end shape of the teeth 4, having a profile 6 which determines the backings 1 and an adjoining front-side profile section 7, which corresponds to the outline shape of the front-side tooth section 8 separated from the remaining tooth by the backing 1 and therefore at least calibrates if not shapes the front-side pitches 9 of the inside teeth 2 in their final shape.

In FIG. 1 the rolling tool 5 is located with the axis of rotation 11 parallel to the axis 10 of the sliding sleeve 3 so that the mutually opposed front-side tooth sections 8 of the teeth 4 of the inside teeth 2 can be formed simultaneously with one rolling tool 5. This means a corresponding pressurisation of the rolling tool 5 in the radial direction with respect to the sliding sleeve 3 which is clamped in a workpiece holder, not shown for reasons of clarity, such that any flaring of the sliding sleeve 3 is prevented, which however is a known measure which is not indicated for reasons of clarity.

Unlike FIG. 1, FIGS. 2 to 4 show the use of rolling tools 5 having an axis of rotation 11 which enclose an acute angle with respect to the axis of rotation 10 of the sliding sleeve 3. As a result of this inclined setting of the rolling tools 5 on the sliding sleeve 3 to be provided with a backing 1, the radial impact of the rolling tools 5 is divided into force components which are active in the radial and axial direction relative to the sliding sleeve 3 so that a more favourable action of force for the plastic displacement of material is obtained compared with the rolling tool 5 having parallel alignment. Despite the sloping position of the rolling tool 5 with respect to the sliding sleeve 3 to be treated, the front-side tooth sections 8 are at least subjected to a calibrating by the profile shape of the rolling tools 5 over their entire length so that as a result of the continuous tight fit, accumulations of material are avoided which can impair the precision and function of the front-side tooth sections 8.

Figure 2:
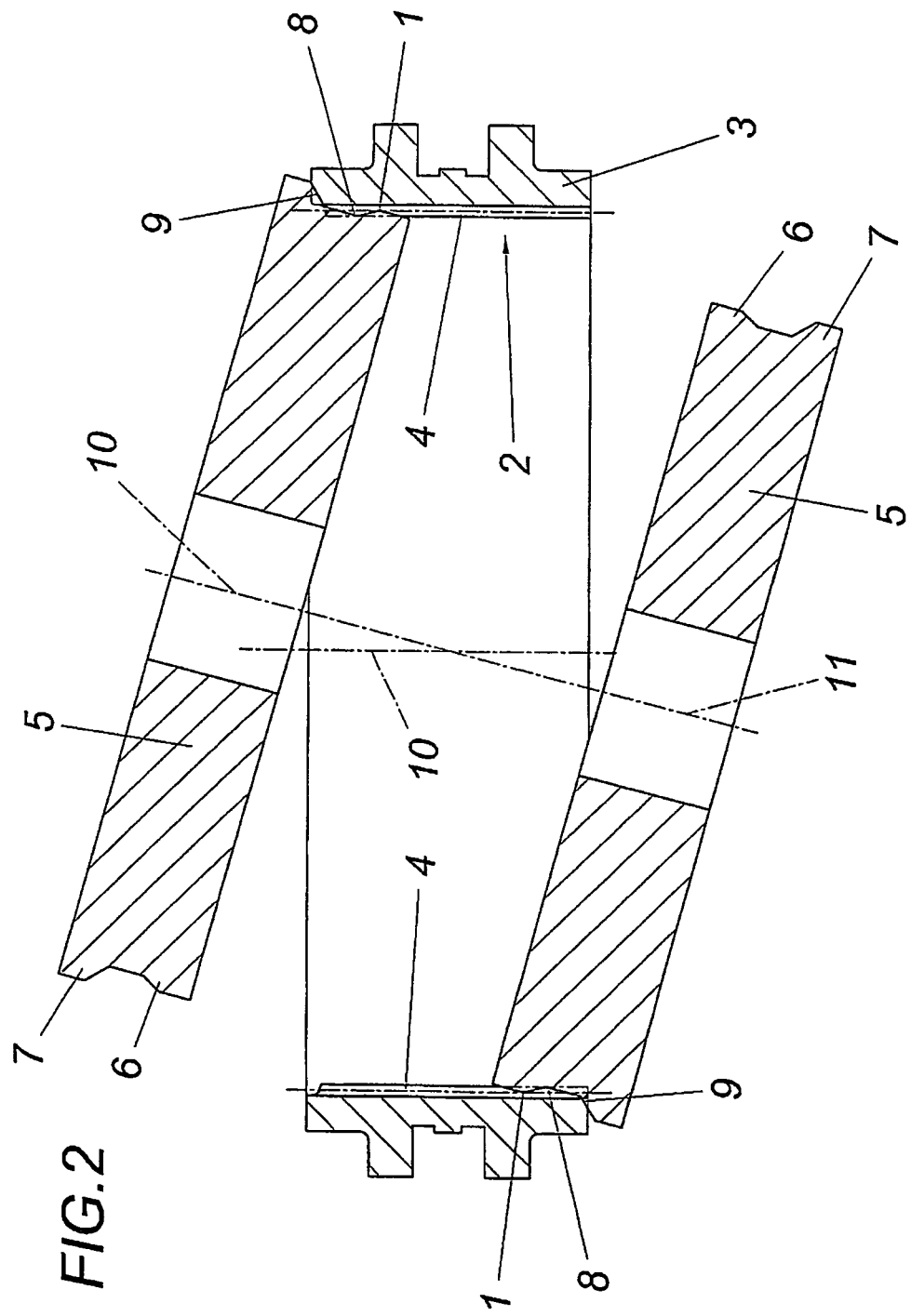
Figure 3:
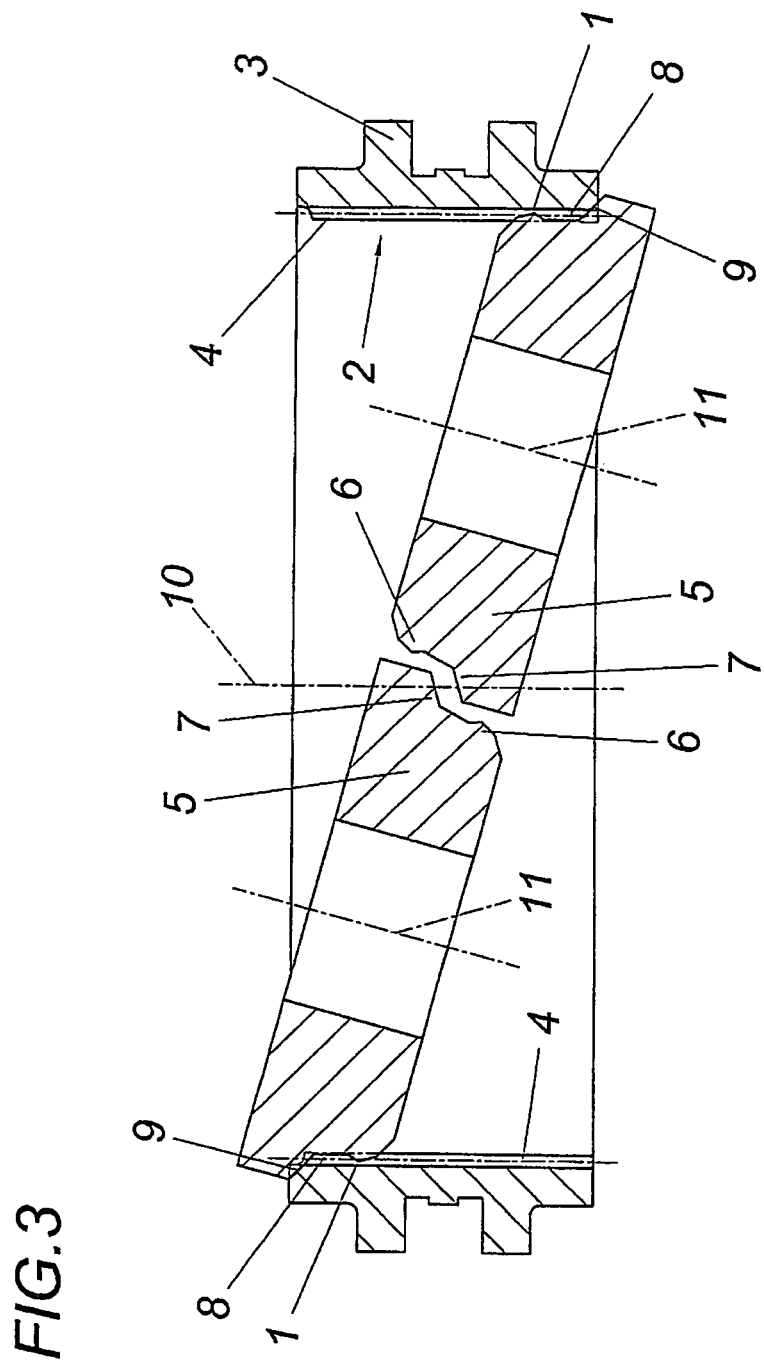

FIG. 2 shows the arrangement of two rolling tools 5 having an identically directed inclination of the axes of rotation 11 in relation to the sleeve axis 10, the rolling tools 5 being offset parallel to one another, which allows correspondingly large diameters of the rolling tools 5. As can be seen in FIG. 3, these rolling tools 5 can also be arranged in a common plane but with a reduced diameter compared with FIG. 2.

Figure 4:
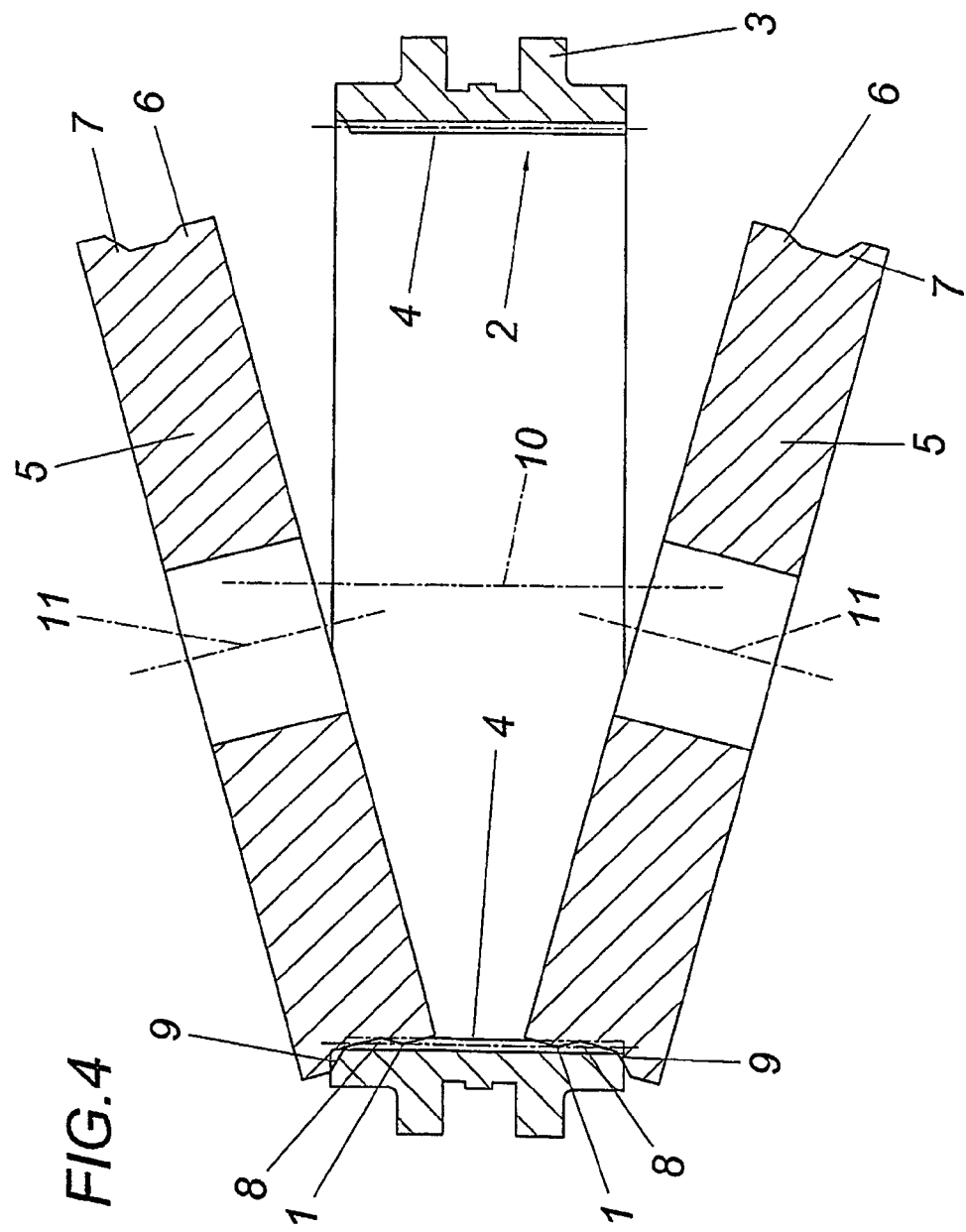

FIG. 4 shows the oppositely directed inclination of the rolling tools 5. This oppositely directed inclination of the axes of rotation 11 in relation to the axis 10 of the sliding sleeve 3 allows symmetrical relationships for the forming of the front-side teeth sections 8. In addition, a continuous profile shape over the entire length of the teeth extending from front side to front side can be achieved by the two rolling tools 5 similar to the rolling tool 5 according to FIG. 1, which can be advantageous for a continuous burr-free tooth formation over the length.

The invention claimed is:

1. A method for backing inside teeth of a sliding sleeve produced by way of powder metallurgy for a manual transmission, wherein backings of the teeth forming front-side pitches are formed with a rolling tool by back-rolling accompanied by plastic displacement of material from a backing region, wherein front-side tooth sections delimited by the backings are at the same time calibrated whilst forming and/or calibrating the front side pitches with the rolling tool for forming the backings.

2. The method according to claim 1, wherein the rolling tool is pressed in an oscillating manner onto the inside teeth of the sliding sleeve.

* * * * *